(12) United States Patent
Chen et al.

(10) Patent No.: US 9,300,220 B2
(45) Date of Patent: Mar. 29, 2016

(54) UNINTERRUPTIBLE POWER SUPPLY SYSTEM

(71) Applicant: VOLTRONIC POWER TECHNOLOGY CORP., Taipei (TW)

(72) Inventors: Ming-Hsien Chen, New Taipei (TW); Juor-Ming Hsieh, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 512 days.

(21) Appl. No.: 13/904,158

(22) Filed: May 29, 2013

(65) Prior Publication Data

US 2014/0354056 A1   Dec. 4, 2014

(51) Int. Cl.
| | |
|---|---|
| *H02J 7/00* | (2006.01) |
| *H02J 9/00* | (2006.01) |
| *G05F 3/06* | (2006.01) |
| *H02M 5/458* | (2006.01) |
| *H02J 9/06* | (2006.01) |
| *H02M 1/42* | (2007.01) |

(52) U.S. Cl.
CPC ............. *H02M 5/458* (2013.01); *H02J 9/062* (2013.01); *H02J 2009/063* (2013.01); *H02M 1/4225* (2013.01); *Y10T 307/549* (2015.04)

(58) Field of Classification Search
USPC .................................................... 307/66, 151
See application file for complete search history.

(56) References Cited

U.S. PATENT DOCUMENTS 4,876,433 A * 10/1989 Kashima et al. ..... B23K 9/1056
219/130.4

* cited by examiner

*Primary Examiner* — Jared Fureman
*Assistant Examiner* — Dru Parries
(74) *Attorney, Agent, or Firm* — Li & Cai Intellectual Property (USA) Office

(57) ABSTRACT

An uninterruptible power supply system including a rectification circuit, a power calibrating conversion circuit, an inverting conversion circuit, an LC circuit, a first output switch, a second output switch and a relay switch is disclosed. The rectification circuit couples to the main electricity. The power calibrating conversion circuit couples to the rectification circuit, and includes an independent drive unit and a switch unit. The inverting conversion circuit couples to the power calibrating conversion circuit. The LC circuit couples between output neutral terminal and output ground terminal. The first output switch couples between the LC circuit and the inverting conversion circuit. The second output switch couples between the inverting conversion circuit and output live terminal. The relay switch couples between the input neutral terminal and the LC circuit. When the relay switch turns on, the input neutral terminal connects with the output neutral terminal through the LC circuit.

10 Claims, 3 Drawing Sheets

UNINTERRUPTIBLE POWER SUPPLY SYSTEM

BACKGROUND OF THE INVENTION

1. Field of the Invention

The present invention relates to an uninterruptible power supply system; in particular, to a full-bridge uninterruptible power supply system.

2. Description of Related Art

The conventional uninterruptible power supply (UPS) system is for continuously providing electric power to the load, and the output neutral terminals of some UPS systems may be under floating status corresponding to the input neutral terminal of the main electricity. Thus, there is a between the output neutral terminal and the output ground terminal. The floating potential according to the requirements of some specific equipment, let the voltage level between the output neutral terminal and the output ground terminal be operated within a specific voltage range, such as operation range within 8 to 10 Vac, or to operation range within 1 to 2 Vac based on being not larger than the voltage level between the input neutral terminal and the input ground terminal. Therefore, some UPS systems may generate potential unbalance, or cannot safely provide electric power to the load.

In addition, some UPS systems use isolated transformers for achieving the specific requirements of the aforementioned equipment. However, if the isolated transformers are installed, the costs and occupying spaces of the UPS system may be increased, and the total power supply conversion efficiency of the UPS system may be reduced.

SUMMARY OF THE INVENTION

The present disclosure is for providing an uninterruptible power supply (UPS) system, in order to solve the aforementioned problems.

The present disclosure provides a UPS system, coupled to main electricity that includes an input live terminal and an input neutral terminal. The UPS system includes a rectification circuit, a power calibrating conversion circuit, an inverting conversion circuit, an LC circuit, a first output switch, a second output switch and a relay switch. The rectification circuit is coupled to the main electricity. The power calibrating conversion circuit is coupled to the rectification circuit, and includes an independent drive unit and a switch unit. The independent drive unit is for controlling the switch unit to turn on or turn off. The inverting conversion circuit is coupled to the power calibrating conversion circuit. The LC circuit is coupled between an output neutral terminal and an output ground terminal. The first output switch is coupled between the LC circuit and the inverting conversion circuit. The second output switch is coupled between the inverting conversion circuit and an output live terminal. The relay switch is coupled between the input neutral terminal and the LC circuit. Moreover, when the relay switch is turned on, the input neutral terminal is connected with the output neutral terminal through the LC circuit.

In an embodiment of the present disclosure, the rectification circuit is a full-bridge circuit. In addition, the LC circuit includes a first inductor and a first capacitor. The first inductor is coupled between the relay switch and the first capacitor, while the first capacitor is coupled between the output neutral terminal and the output ground terminal.

In an embodiment of the present disclosure, the first output switch includes a first common terminal, a first switching terminal and a second switching terminal. The first common terminal is coupled to the output neutral terminal, while the first switching terminal is coupled to the input neutral terminal, and the second switching terminal is coupled to the inverting conversion circuit. The second output switch includes a second common terminal, a third switching terminal and a fourth switching terminal. The second common terminal is coupled to the output live terminal, while the third switching terminal is coupled to the input live terminal, and the fourth switching terminal is coupled to the inverting conversion circuit.

In an embodiment of the present disclosure, the inverting conversion circuit further includes an output capacitor that has a first terminal and a second terminal. The first terminal is coupled to the second switching terminal of the first output switch, and the second terminal is coupled to the fourth switching terminal of the second output switch.

The UPS system of the present disclosure based on the relay switch makes the input neutral terminal and the output neutral terminal form a common neutral status. Thus, the input neutral terminal, the input ground terminal, the output neutral terminal and the output ground terminal keep at low voltage levels, for matching the requirements of specific equipment, in order to increase the usage convenience of the UPS system.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

Figure 1:
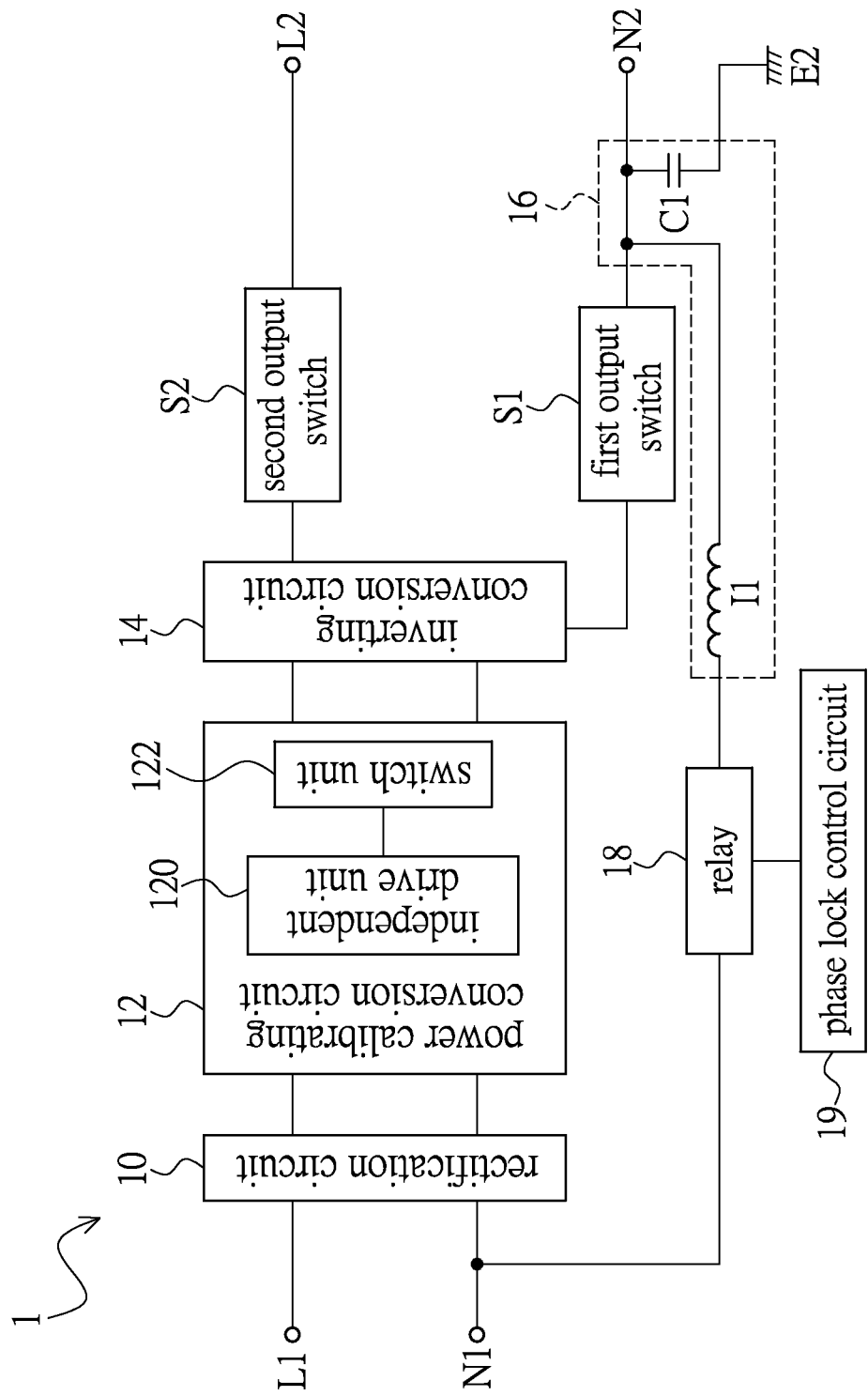
FIG. 1 shows a function block diagram of an uninterruptible power supply (UPS) system according to an embodiment of the present disclosure.

FIG. 1 shows a function block diagram of an uninterruptible power supply (UPS) system according to an embodiment of the present disclosure. Please refer to FIG. 1. The UPS system 1 is coupled to main electricity that has an input live terminal L1 and an input neutral terminal N1. The UPS system 1 includes a rectification circuit 10, a power calibrating conversion circuit 12, an inverting conversion circuit 14, an LC circuit 16, a first output switch S1, a second output switch S2 and a relay switch 18. Practically, when the main electricity provides power normally, the UPS system 1 provides the output voltage to a load (not shown) through the rectification circuit 10, the power calibrating conversion circuit 12, the inverting conversion circuit 14, the first output switch S1 and the second output switch S2, wherein the relay switch 18 is turned on, the input neutral terminal N1 is connected with the output neutral terminal N2 through the LC circuit 16. When the main electricity cuts off, the battery module (not shown) provides electric power to the load through the inverting conversion circuit 14, so as to continuously provide electric power to the load.

The rectification circuit 10 is coupled between the main electricity and the power calibrating conversion circuit 12. The rectification circuit 10 may be, for example, a full-bridge circuit. Practically, the rectification circuit 10 may be, for example, an AC to DC power rectification circuit or a full-wave rectification circuit, for rectifying the waveform of the AC power, such as the main electricity, to the input power that is able to be used by the load. The input power may be full-wave pulse DC. It's worth noting that the implementation of the rectification circuit 10 is not limited thereby, it can also be a half-wave rectification circuit.

The power calibrating conversion circuit 12 is coupled between the rectification circuit 10 and the inverting conversion circuit 14, and the power calibrating conversion circuit 12 includes an independent drive unit 120 and a switch unit 122. The independent drive unit 120 is for controlling the switch unit 122 to turn on or turn off. Practically, the power calibrating conversion circuit 12 is for calibrating the power factor, for example, for making the approximate to 1, in order to increase the efficiency of power conversion. The one skilled in the art can freely design the power calibrating conversion circuit 12 according to the actual requirements.

Specifically, the switch unit 122 may be, for example, a bipolar junction transistor (BJT), a power transistor or a field effect transistor, and then the implementation of the switch unit 122 is not limited by the present embodiment. The independent drive unit 120 is implemented by, for example, a drive chip or a switching control chip, and is not limited by the present embodiment. For example, the switch unit 122 is a BJT, and the general drive unit is usually coupled between the base node and the emitting node of the BJT. However, the independent drive unit 120 of the present disclosure is coupled to the base node of the BJT, thus the independent drive unit 120 drives the switch unit 122 to turn on or off in isolating type. The present embodiment does not limit the implementation of the independent drive unit 120 driving the switch unit 122.

The inverting conversion circuit 14 is coupled between the power calibrating conversion circuit 12, the first output switch S1 and the second output switch S2. Practically, the inverting conversion circuit 14 may be, for example, an inverter, for converting the DC power to standard and stable AC power. The inverting conversion circuit 14 outputs the voltage to the load through the first and second output switches S1 and S2, thus the output voltage of the inverting conversion circuit 14 is about the same as the load voltage.

The LC circuit 16 is coupled between an output neutral terminal N2, an output ground terminal E2 and the first output switch S1. Practically, the LC circuit 16 includes a first inductor I1 and a first capacitor C1. The first inductor I1 is coupled between the relay switch 18 and the first capacitor C1, and the first capacitor C1 is coupled between the output neutral terminal N2 and the output ground terminal E2. Moreover, the first capacitor C1 and the first inductor I1 is for filtering or eliminating noises. For example, when the main electricity is cut off, the voltage of the battery module may convert into the DC voltage needed by the inverting conversion circuit 14, and the DC voltage is then converted by the inverting conversion circuit 14 into an AC power for providing to the load. Furthermore, the first capacitor C1 of the LC circuit 16 can store electricity and serves as a dummy load at the instant moment when the main electricity is cut off, so as to protect the load.

Specifically, the present disclosure increase the design of the LC circuit 16, for reducing the voltage levels of the output neutral terminal N2 and the output ground terminal E2 within the UPS system 1. For example, making the voltage levels of the output neutral terminal N2 and the output ground terminal E2 match the application requirements of the load equipment. Moreover, the present disclosure does not use the design of the isolated transformers, is able to save the cost of the isolated transformers, and keeps the total efficiency of the UPS system 1.

The first output switch S1 is coupled between the LC circuit 16 and the inverting conversion circuit 14, and the second output switch S2 is coupled between the inverting conversion circuit 14 and an output live terminal L2. Practically, the first and the second output switches S1 and S2 are, for example, the electromagnetic type, the sensing type, the electro-dynamic type, or the electronic type relays, the implementations of the first and the second output switches S1 and S2 are not limited by the present embodiment. In addition, the first and second output switches S1 and S2 are able to switch synchronously. For example, when the first output switch S1 is turned on, the second output switch S2 may also be turned on, for making the inverting conversion circuit 14, the output live terminal L2 and the output neutral terminal N2 form a close loop, in order to provide the output voltage to the load.

The relay switch 18 is coupled between the input neutral terminal N1 and the LC circuit 16. The relay switch 18 may be, for example, the electromagnetic type, the sensing type, the electro-dynamic type, or the electronic type relay, and the present embodiment does not limit the implementation of the relay switch 18. Practically, the relay switch 18 is for controlling the input neutral terminal N1 to connect or disconnect with the output neutral terminal N2. When the relay switch 18 turns on, the input neutral terminal N1 is connected with the output neutral terminal N2 through the LC circuit 16, for making the input neutral terminal N1 and the output neutral terminal N2 form a connecting common neutral status. Thus, the input neutral terminal N1, the output neutral terminal N2 and the output ground terminal E2 keep at low voltage levels, for matching the requirements of specific equipment. In addition, the present disclosure may also reduce the possibility of the user to get an electric shock.

Moreover, the UPS system 1 further includes a phase lock control circuit 19 which is coupled to the relay switch 18. When the output phase of the UPS system 1 is the same as the input phase of the main electricity, the phase lock control circuit 19 controls conduction of the relay switch 18 for the input neutral terminal N1 connecting via the LC circuit 16 with the output neutral terminal N2. Practically, the phase lock control circuit 19 controls the relay switch 18 to turn on or off by using the phase lock control techniques. For example, the phase lock control circuit 19 detects the input phase of the main electricity by detecting the site wiring fault detector of the wiring of the main electricity. Thus, the phase lock control circuit 19 is able to make the output phase of the UPS system 1 the same as the input phase of the main electricity.

It's worth noting that, in other embodiments, the phase lock control circuit 19 can also be implemented by the firmware or control programs. For example, the relay switch 18 and the phase lock control circuit 19 may form a relay with phase lock control program or firmware, and the relay turns on or off according to the input phase and the output phase. When the input phase is the same as the output phase, the relay is turned on for executing phase lock operation. The present embodiment does not limit the implementation of the phase lock control circuit 19.

Figure 2:
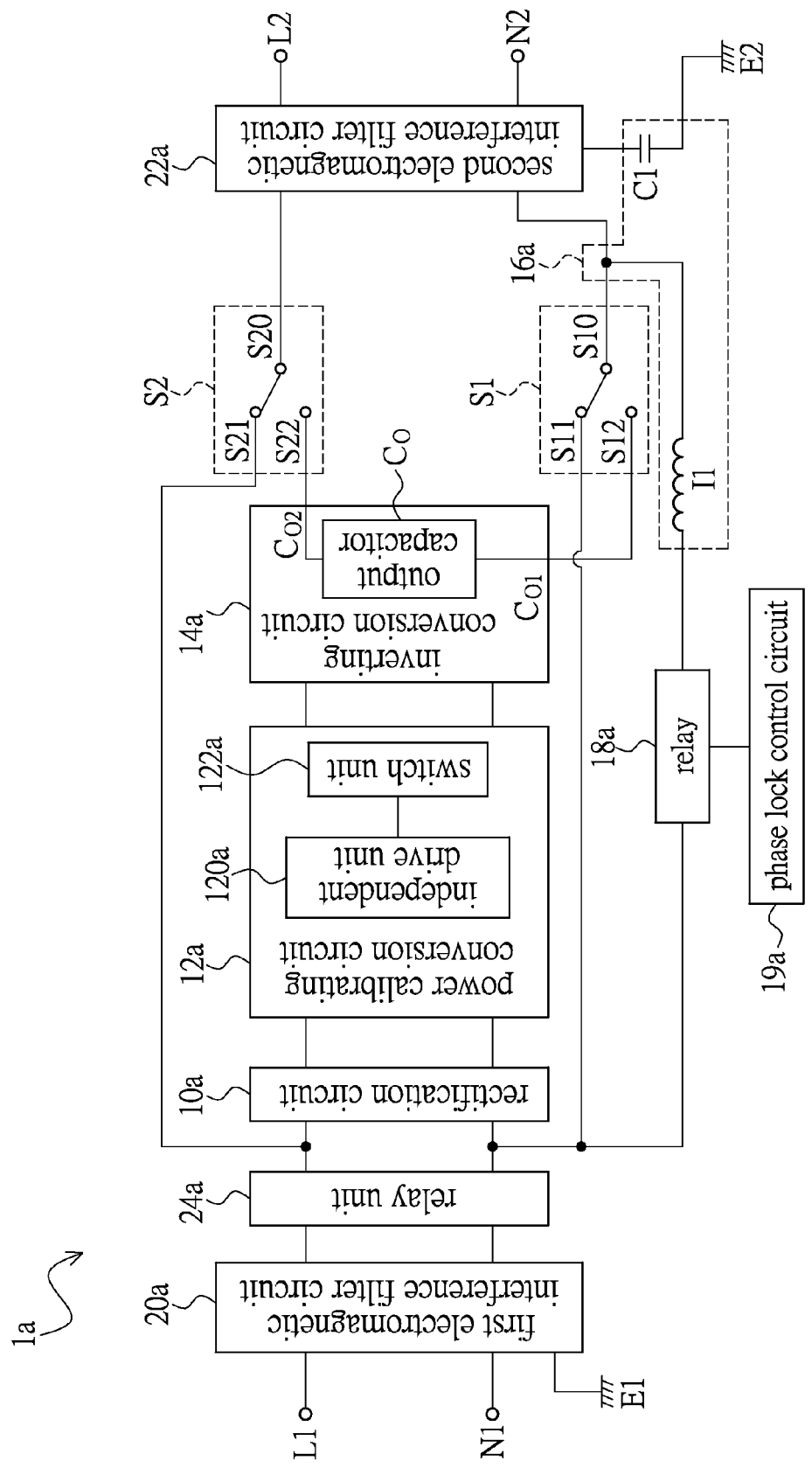
FIG. 2 shows a function block diagram of a UPS system according to another embodiment of the present disclosure.

FIG. 2 shows a function block diagram of a UPS system according to another embodiment of the present disclosure. Please refer to FIG. 2. The UPS systems 1a and 1 of the present embodiment and the aforementioned embodiment are similar to each other. For example, the UPS system 1a can also make the input neutral terminal N1 connect with the output neutral terminal N2 that forms a common neutral status. Thus, the input neutral terminal N1, the input ground terminal E1, the output neutral terminal N2 and the output ground terminal E2 are able to keep at low voltage level, in order to match the requirements of the specific equipment and reduce the possibility of the user getting electric shock.

However, there are differences between the UPS system 1a and 1. The differences are that the UPS system 1a further includes a first electromagnetic interference (EMI) filter circuit 20a and a second EMI filter circuit 22a. The first EMI filter circuit 20a is coupled between the power calibrating conversion circuit 12a, the input live terminal L1, the input neutral terminal N1 and an input ground terminal E1. The second EMI filter circuit 22a is coupled between the inverting conversion circuit 14a, the output live terminal L2, the output neutral terminal N2 and the output ground terminal E2. The present embodiment does not limit the implementation of the UPS system 1a.

Specifically, the EMI filter circuit can suppress the electromagnetic noises of the AC voltage. Thus, the first EMI filter circuit 20a is used for filtering the EMI of the main electricity, such as an AC power, and the second EMI filter circuit 22a is used for filtering the EMI of the output voltage, such as an AC power. Therefore, the present disclosure uses the first and second EMI filter circuits 20a and 22a for matching the filtering standard of EMI.

It's worth noting that, the first output switch S1 includes a first common terminal S10, a first switching terminal S11 and a second switching terminal S12. The first common terminal S10 is coupled to the output neutral terminal N2, while the first switching terminal S11 is coupled to the input neutral terminal N1, and the second switching terminal S12 is coupled to the inverting conversion circuit 14a. The second output switch S2 includes a second common terminal S20, a third switching terminal S21 and a fourth switching terminal S22. The second common terminal S20 is coupled to the output live terminal L2, while the third switching terminal S21 is coupled to the input live terminal L1, and the fourth switching terminal S22 is coupled to the inverting conversion circuit 14a.

Specifically, the first switching terminal S11 and the third switching terminal S21 are coupled to a bypass loop, and the second switching terminal S12 and the fourth switching terminal S22 are coupled to the inverting conversion circuit 14a. When the UPS system 1a is overloaded or broken, the first and second output switches S1 and S2 can be coupled to the bypass loop, thus the UPS system 1a can still provide output voltage to the load. The one skilled in the art may freely design the implementations thereof according to the actual requirements.

The inverting conversion circuit 14a further includes an output capacitor Co which has a first terminal Co1 and a second terminal Co2. The first terminal Co1 is coupled to the second switching terminal S12 of the first output switch S1, and the second terminal Co2 is coupled to the fourth switching terminal S22 of the second output switch S2. Thus, the inverting conversion circuit 14a is via the second switching terminal S12 of the first output switch S1, coupled to the output neutral terminal N2 which is in the common neutral status and the LC circuit 16a.

In addition, the UPS system 1a further includes a relay unit 24a coupled between the rectification circuit 10a and the first EMI filter circuit 20a. Practically, the relay unit 24a may be, for example, an electromagnetic type, a sensing type, an electro-dynamic type, or an electronic type relay, and the present embodiment does not limit the implementation of the relay unit 24a.

For example, when the status of the relay unit 24a is "ON", the conduction of the relay unit 24a let the rectification circuit 10a, the power calibrating conversion circuit 12a, the inverting conversion circuit 14a and the load form a close loop. Thus, the UPS system 1a provides electric power to the load by using the main electricity. When the status of the relay unit 24a is "OFF", the cutoff of the relay unit 24a let the rectification circuit 10a, the power calibrating conversion circuit 12a, the inverting conversion circuit 14a and the load form an open loop. Thus, the UPS system 1a provides electric power to the load by using the battery module. In addition to the aforementioned differences, the one skilled in the art may easily derived by referring to the aforementioned embodiments and the differences, thus are not repeatedly described herein.

The following descriptions show the detail structures and operations of the UPS system.

Figure 3:
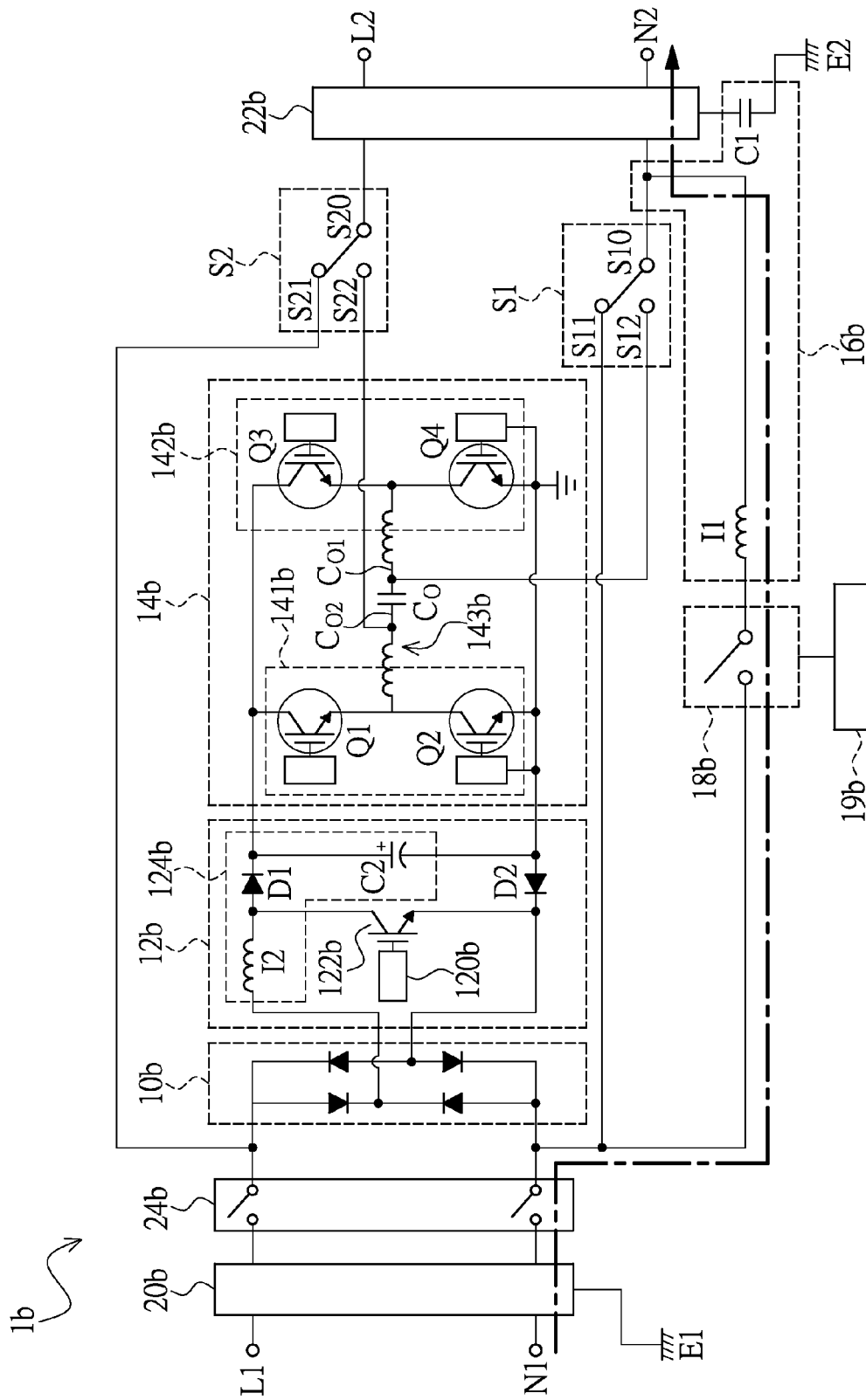
FIG. 3 shows a circuit diagram of a UPS system based on FIG. 2 according to an embodiment of the present disclosure.

FIG. 3 shows a circuit diagram of an UPS system based on FIG. 2 according to another embodiment of the present disclosure. Please refer to FIG. 3. The power calibrating conversion circuit 12b in this embodiment further includes a boost circuit 124b and a second diode D2. Practically, the boost circuit 124b is coupled to the switch unit 122b, and the boost circuit 124b includes a first diode D1, a second inductor 12 and a second capacitor C2. The second inductor 12 is coupled between the anode of the first diode D1, the switch unit 122b and the rectification circuit 10b. The second capacitor C2 is connected with the switch unit 122b in parallel connection. The cathode of the second diode D2 is coupled to the switch unit 122b, and the anode of the second diode D2 is coupled to the second capacitor C2.

Specifically, when the switch unit 122b turns off, the boost circuit 124b charges the second capacitor C2. When the switch unit 122b turns on, the discharging current of the second inductor 12 passes through the switch unit 122b. The second capacitor C2 discharges and the discharging power goes to the inverting conversion circuit 14b. The second diode D2 limits the flowing direction of the currents, for making the currents flow from the anode to the cathode of the second diode D2, thus the second diode D2 can serve as the electrically isolating operation component of the power calibrating conversion circuit 12b and the inverting conversion circuit 14b for one-way loop isolation. The present embodiment does not limit the implementations of the second diode D2 and the boost circuit 124b.

The inverting conversion circuit 14b further includes a first switch circuit 141b, a second switch circuit 142b and an inductor circuit 143b. The first switch circuit 141b is connected with the second switch circuit 142b in parallel connection. The output capacitor Co is coupled between the first switch circuit 141b and the second switch circuit 142b. The inductor circuit 143b is serially connected with the output capacitor Co. The first switch circuit 141b includes a first switch component Q1 and a second switch component Q2, and the second switch circuit 142b includes a third switch component Q3 and a fourth switch component Q4. The operations of conduction and cutoff of the first, second, third, and fourth switch components Q1, Q2, Q3, and Q4 are the same as the common inverters, thus are not repeatedly described herein.

On the basis of the above, the present disclosure discloses a UPS system. The UPS system makes the input neutral terminal connect with the output neutral terminal, so as to form a common neutral status by using a relay switch. Thus, the input neutral terminal, the input ground terminal, the output neutral terminal and the output ground terminal can be able to keep at low voltage level, for matching the requirements of specific application equipment. In addition, the power calibrating conversion circuit includes an independent drive unit, a switch unit, a boost circuit and a second diode. The independent drive unit is for controlling the switch unit to turn on or off, and the second diode serves as an electrical isolation operation component of the power calibrating conversion circuit and the inverting conversion circuit for one-way loop isolation. Moreover, the LC circuit may make the voltages of the output neutral terminal and the output ground terminal be at low voltage level. Therefore, the UPS system of the present disclosure can increase the operation convenience.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. An uninterruptible power supply system, coupled to a main electricity which includes an input live terminal and an input neutral terminal, comprising:
    a rectification circuit, coupled to the main electricity;
    a power calibrating conversion circuit, coupled to the rectification circuit, wherein the power calibrating conversion circuit includes an independent drive unit and a switch unit, and the independent drive unit is for controlling the switch unit to turn on or turn off;
    an inverting conversion circuit, coupled to the power calibrating conversion circuit;
    an LC circuit, coupled between an output neutral terminal and an output ground terminal;
    a first output switch, coupled between the LC circuit and the inverting conversion circuit;
    a second output switch, coupled between the inverting conversion circuit and an output live terminal; and
    a relay switch, coupled between the input neutral terminal and the LC circuit;
    wherein when the relay switch turns on, the input neutral terminal is connected with the output neutral terminal through the LC circuit.

2. The uninterruptible power supply system according to claim 1, further comprising a phase lock control circuit, coupled to the relay switch, wherein when an output phase of the uninterruptible power supply system is the same as an input phase of the main electricity, the phase lock control circuit controls conduction of the relay switch for the input neutral terminal connecting via the LC circuit with the output neutral terminal.

3. The uninterruptible power supply system according to claim 1, wherein the rectification circuit is a full-bridge circuit, the LC circuit includes a first inductor and a first capacitor, the first inductor is coupled between the relay switch and the first capacitor, and the first capacitor is coupled between the output neutral terminal and the output ground terminal.

4. The uninterruptible power supply system according to claim 1, wherein the first output switch includes a first common terminal, a first switching terminal and a second switching terminal, while the first common terminal is coupled to the output neutral terminal, the first switching terminal is coupled to the input neutral terminal, and the second switching terminal is coupled to the inverting conversion circuit; the second output switch includes a second common terminal, a third switching terminal and a fourth switching terminal, while the second common terminal is coupled to the output live terminal, the third switching terminal is coupled to the input live terminal, and the fourth switching terminal is coupled to the inverting conversion circuit.

5. The uninterruptible power supply system according to claim 4, wherein the inverting conversion circuit further includes an output capacitor having a first terminal and a second terminal, the first terminal is coupled to the second switching terminal of the first output switch, and the second terminal of the output capacitor is coupled to the fourth switching terminal of the second output switch.

6. The uninterruptible power supply system according to claim 5, wherein the inverting conversion circuit further includes a first switch circuit, a second switch circuit and an inductor circuit, while the first switch circuit is connected with the second switch circuit in parallel connection, the output capacitor is coupled between the first switch circuit and the second switch circuit, and the inductor circuit is connected with the output capacitor in serial connection, and then the first switch circuit includes a first switch component and a second switch component, and the second switch circuit includes a third switch component and a fourth switch component.

7. The uninterruptible power supply system according to claim 1, further comprising a first electromagnetic interference filter circuit and a second electromagnetic interference filter circuit, wherein the first electromagnetic interference filter circuit is coupled between the power calibrating conversion circuit, the input live terminal, the input neutral terminal and an input ground terminal, while the second electromagnetic interference filter circuit is coupled between the inverting conversion circuit, the output live terminal, the output neutral terminal and the output ground terminal.

8. The uninterruptible power supply system according to claim 7, further comprising a relay unit coupled between the rectification circuit and the first electromagnetic interference filter circuit.

9. The uninterruptible power supply system according to claim 1, wherein the power calibrating conversion circuit further includes a boost circuit coupled to the switch unit, and the boost circuit includes a first diode, a second inductor and a second capacitor, while the second inductor is coupled among an anode of the first diode, the switch unit and the rectification circuit, and then the second capacitor is connected with the switch unit in parallel connection.

10. The uninterruptible power supply system according to claim 9, wherein the power calibrating conversion circuit further includes a second diode, while a cathode of the second diode is coupled to the switch unit, and an anode of the second diode is coupled to the second capacitor.

* * * * *